United States Patent [19]

Sasaki

[11] Patent Number: 5,785,317
[45] Date of Patent: Jul. 28, 1998

[54] OPERATION APPARATUS FOR A GAME MACHINE

[75] Inventor: Shinkichi Sasaki, Fukushima-ken, Japan

[73] Assignee: Alps Electric Co., Ltd., Tokyo, Japan

[21] Appl. No.: 572,774

[22] Filed: Dec. 15, 1995

[30] Foreign Application Priority Data

Dec. 22, 1994 [JP] Japan ................... 6-320578

[51] Int. Cl.⁶ ................................................. A63F 9/22
[52] U.S. Cl. ................... 273/148 B; 463/37; 463/38; 463/46; 345/156
[58] Field of Search ................ 273/148 B; 463/37, 463/38, 46, 47; 345/156, 157, 161

[56] References Cited

U.S. PATENT DOCUMENTS

| | | |
|---|---|---|
| 5,059,958 | 10/1991 | Jacobs et al. ............ 273/148 B X |
| 5,175,534 | 12/1992 | Thatcher ......................... 345/156 |
| 5,207,426 | 5/1993 | Inoue et al. |
| 5,329,276 | 7/1994 | Hirabayashi ................. 463/38 X |
| 5,624,117 | 4/1997 | Ohkubo et al. .............. 273/148 B |
| 5,661,253 | 8/1997 | Aoki ............................... 84/658 |

*Primary Examiner*—Raleigh W. Chiu
*Attorney, Agent, or Firm*—Brinks Hofer Gilson & Lione

[57] ABSTRACT

The invention relates to an operation apparatus for a game machine called controller or the like, and more particularly to a novel operation apparatus for a game machine which is improved in operability and operation feeling. A housing includes a pair of leftwardly and rightwardly separate portions of a left casing and a right casing. A cross-shaped key top and a left side manually operable key are disposed on a face of the left casing while a key switch or switches and a right side manually operable key are disposed on a face of the right casing. The right casing is fitted for rotation in a relay ring secured to the left casing, and a connection ring is fixed in the inside of the right casing and is held in meshing engagement with a rotary shaft of a rotary volume. The rotary volume is operated when the left casing and the right casing are manually rotated relative to each other.

7 Claims, 6 Drawing Sheets

1

OPERATION APPARATUS FOR A GAME MACHINE

BACKGROUND OF THE INVENTION

1. Field of the Invention

This invention relates to an operation apparatus for a game machine, which is often called controller or the like.

2. Description of the Related Art

An operation apparatus for a game machine of the type mentioned includes an outer shell formed from a housing. The housing is held by the palms of the two hands of an operator, and a plurality of key tops disposed on a principal surface of the operation apparatus are manually operated by the thumbs or fingers of the hands to input an instruction of a direction of movement or a moving condition of a character on a screen of a game.

In an operation apparatus for a game machine of the type described above, as the difficulty and complexity of the contents of games increase recently, the number of key tops is inclined to increase. One of such operation apparatus for a game machine is disclosed, for example, in Japanese Utility Model Laid-Open No. Hei 4-42029 (1992). The operation apparatus for a game machine includes a cross-shaped key top and a plurality of key tops disposed at left and right positions of a principal surface of a housing, and a pair of key tops disposed on a side face of the housing. With the operation apparatus, an operator can manually depress the key tops on the principal surface of the housing with the left and right thumbs and simultaneously depress the key tops on the side face of the housing with the index fingers or middle fingers.

In the conventional operation apparatus for a game machine described above, since the key tops are disposed not only on the principal surface but also on the side face of the housing such that they may be selectively depressed using several fingers of the left and right hands of an operator including the thumbs, the operation apparatus allows some increased number of key tops accommodated therein. However, the conventional operation apparatus for a game machine is disadvantageous in that, since the number of fingers which can be used at a time by an operator is limited, if the number of key tops is increased further, then the operability is deteriorated remarkably. The conventional operation apparatus for a game machine is further disadvantageous in that, as the number of key tops disposed on the surface of the housing increases, since also the arrangement space for the key tops increases, an increase in size cannot be avoided.

The conventional operation apparatus for a game machine is disadvantageous also in that, since signals outputted from the key tops are all on/off switch signals, where the game is of the type wherein the operation amount and the operation speed are controlled at a time such as, for example, a steering operation or an acceleration operation in a racing game, mere on/off signals are liable to cause an operator to have an unfamiliar feeling in such steering operation or acceleration operation, resulting in inferiority in operation feeling.

SUMMARY OF THE INVENTION

It is an object of the present invention to provide a novel operation apparatus for a game machine which is superior in operability and operation feeling.

When an operator holds a left casing and a right casing of a housing with the palms of the left and right hands and manually operates operation keys disposed on principal faces of the left casing and the right casing suitably with the fingers of the left and right hands, a first instruction signal and a second instruction signal are outputted from first manually operable means and second manually operable means, respectively. When the operator manually rotates the left, casing and the right casing relative to each other, a rotary electric part such as a rotary volume or a rotary encoder accommodated in the housing is operated, whereupon an analog signal or a pulse signal is outputted from third manually operable means. In this instance, since the left and right casings are held by and manually rotated relative to each other with the left and right palms, also the rotary electric part of the third manually operable means can be manually operated at a time when the operation keys of the first manually operable means and the second manually operable means are manually operated by the fingers of the left and right hands.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
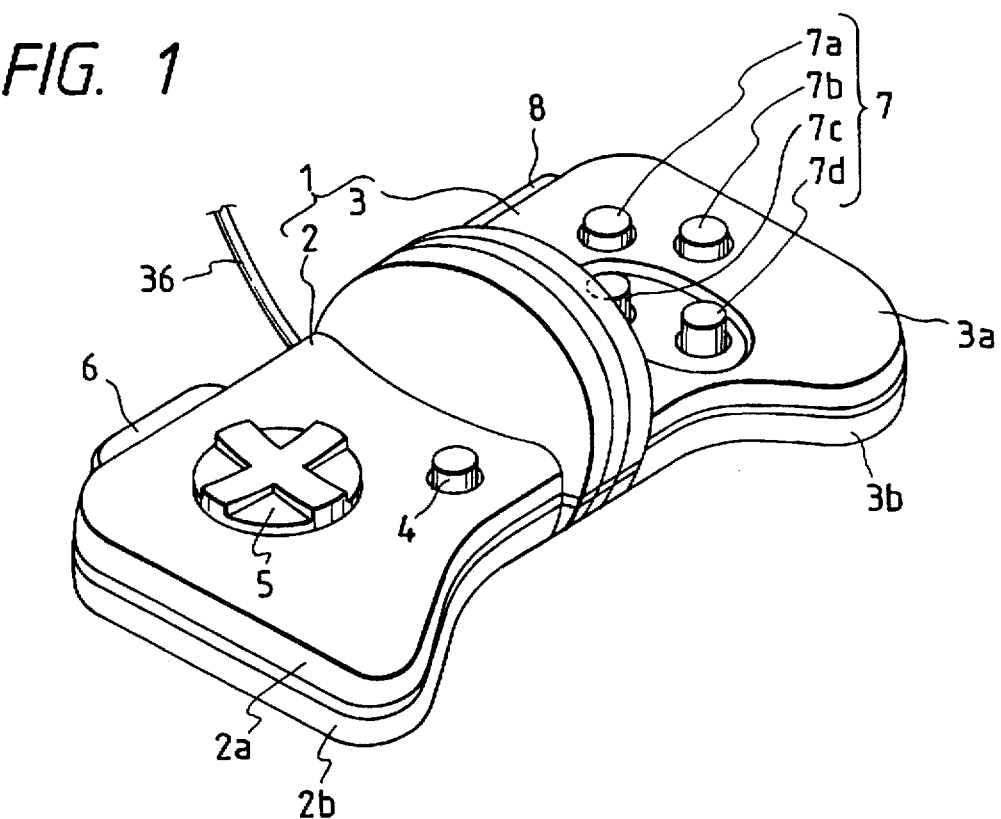
FIG. 1 is a schematic perspective view of an operation apparatus for a game machine as viewed from the front face side showing a preferred embodiment of the present invention.
Figure 2:
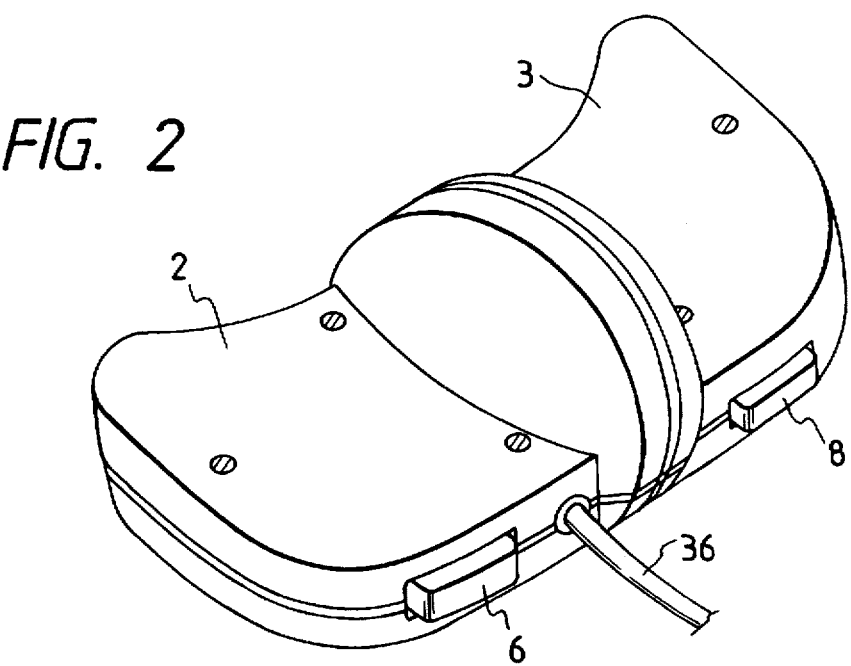
FIG. 2 is a similar view but showing the operation apparatus as viewed from the rear face side.
Figure 3:
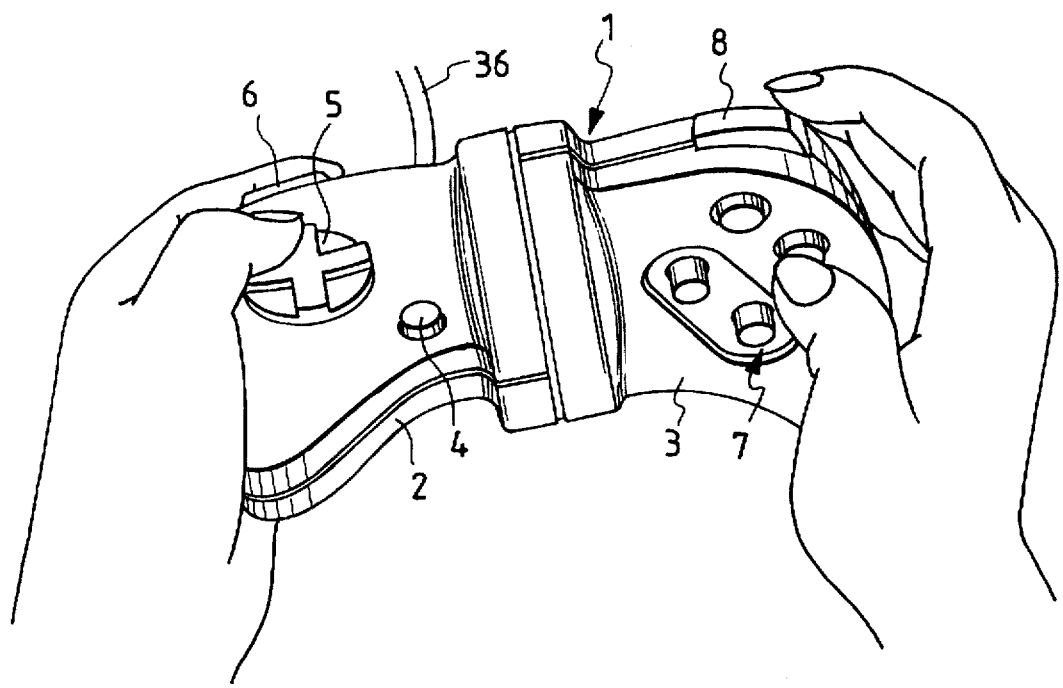
FIG. 3 is a schematic perspective view showing the operation apparatus in use.

Referring first to FIGS. 1 to 3, a housing denoted at 1 forms an outer shell of an operation apparatus for a game machine. The housing 1 is divided into two separate left and right portions of a left casing 2 and a right casing 3. The left casing 2 includes an upper half 2a and a lower half 2b joined integrally to each other by means of a screw not shown. A start key 4 and a cross-shaped key top 5 which serves as first manually operable means are disposed on a surface of the upper half 2a, and a left side manually operable key 6 is disposed on a rear face (rear side face) of the left casing 2. Meanwhile, also the right casing 3 includes an upper half 3a and a lower half 3b joined integrally to each other by means of a screw not shown. Four key switches 7 (7a to 7d) serving as second manually operable means are disposed in a neighboring relationship to each other on a surface of the upper half 3a, and a right side manually operable key 8 is disposed on a rear face (rear side face) of the right casing 3. The cross-shaped key top 5 functions as a direction instructing operation element, and the other key switches 7a to 7d as well as the left side manually operable key 6 and the right side manually operable key 8 function as movement instructing operation elements. However, which movement each of the movement instructing operation elements should instruct is determined suitably by software of each game.

Figure 4:
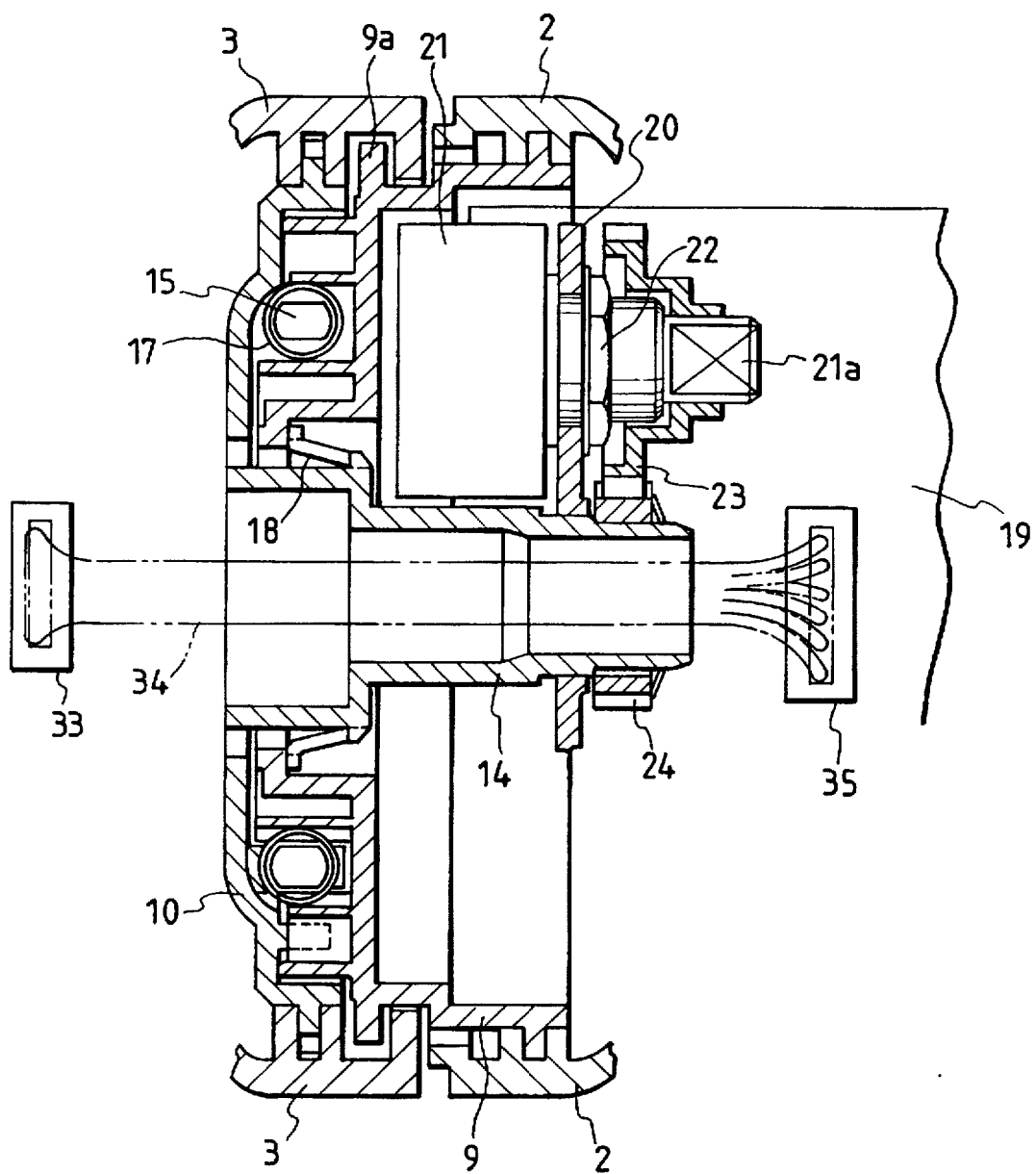
FIG. 4 is a sectional view showing a connection mechanism for a left casing and a right casing provided in the operation apparatus as viewed from the rear face side.

Referring now to FIG. 4, a relay ring 9 is fitted in and fixed to a right side inner circumferential face of the left casing 2. The right casing 3 is fitted at a left side inner circumferential end thereof for sliding movement in a guide groove 9a formed on an outer circumferential face of the relay ring 9. The left casing 2 and the right casing 3 are connected for rotation relative to each other by way of the relay ring 9. Consequently, when the left casing 2 and the right casing 3 are manually operated to rotate relative to each other, a rotary volume 21 serving as third manually operable means is operated to generate an analog signal as hereinafter described. A connection ring 10 is fitted in and fixed to a left side inner circumferential face of the right casing 3. The connection ring 10 and the relay ring 9 are connected for relative rotation to each other at the middle between them.

Figure 5:
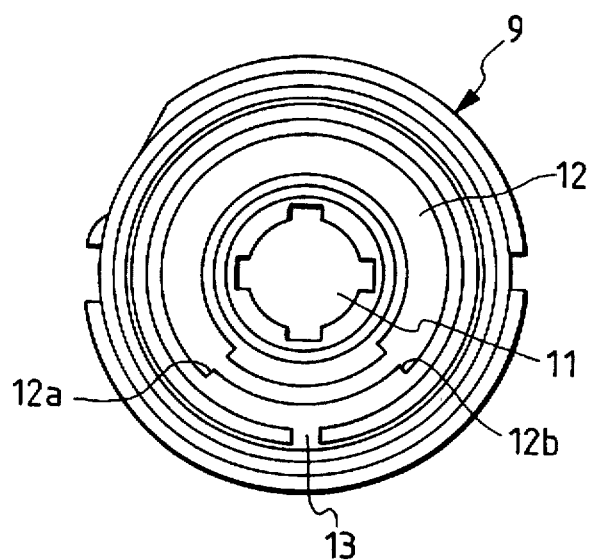
FIG. 5 is a right side elevational view of a relay ring provided in the connection mechanism.
Figure 6:
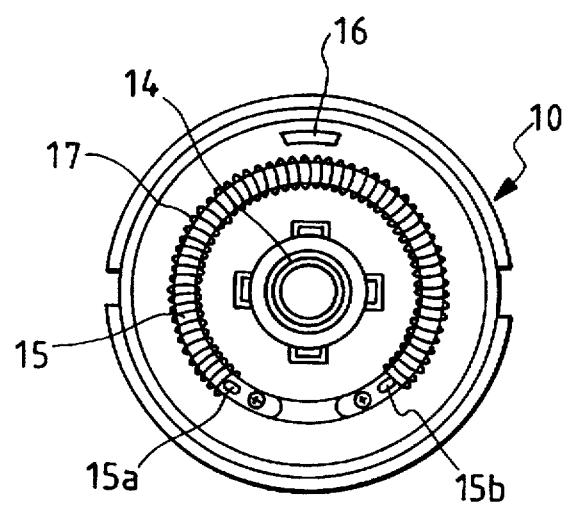
FIG. 6 is a left side elevational view of a connection ring provided in the connection mechanism.
Figure 7A:
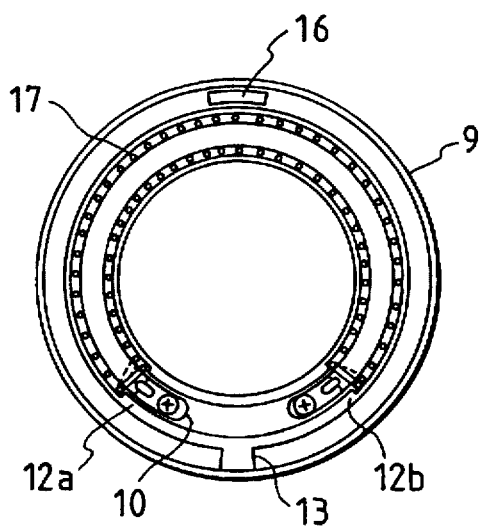
FIGS. 7A to 7C are schematic views illustrating self returning movements of the connection mechanism.
Figure 7B:
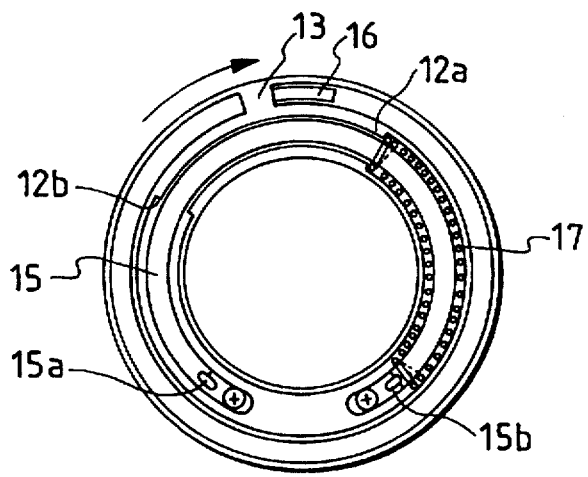
Figure 7C:
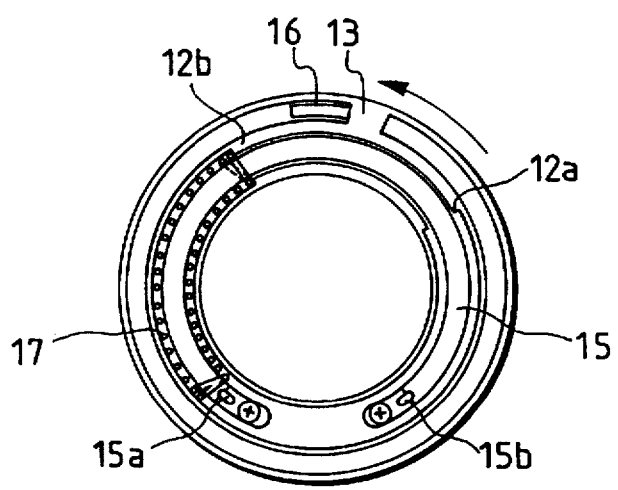

Referring also to FIG. 5, a center hole 11 is formed in the relay ring 9, and an annular recessed groove 12 is formed on the relay ring 9 around the center hole 11. A pair of stepped portions 12a and 12b are formed in the recessed groove 12. A restriction wall 13 is formed on the relay ring 9 and extends outwardly of the recessed groove 12. The restriction wall 13 is positioned substantially intermediately between the stepped portions 12a and 12b. Referring also to FIG. 6, a hollow shaft 14 is formed integrally at the center of the connection ring 10, and an annular guide bar 15 is screwed to and extends around the hollow shaft 14. A stopper 16 is provided uprightly around the annular guide bar 15. A coil spring 17 is wound around the annular guide bar 15 and is anchored at the opposite ends thereof to a pair of projections 15a and 15b. The relay ring 9 and the connection ring 10 are connected for relative rotation to each other with the hollow shaft 14 fitted in the center hole 11, and are prevented from coming off each other by means of a washer 18. In this instance, since the coil spring 17 and the recessed groove 12 of the relay ring 9 are so dimensioned that the coil spring 17 is disposed in the recessed groove 12 and contacts at the opposite ends thereof with the stepped portions 12a and 12b, the relay ring 9 and the connection ring 10 are normally held in a centered condition shown in FIG. 7A by the coil spring 17. If the relay ring 9 and the connection ring 10 are rotated relative to each other from the centered condition, for example, if the relay ring 9 is rotated in the clockwise direction with respect to the connection ring 10, then the coil spring 17 is pressed by the stepped portion 12a of the recessed groove 12 and is spaced away from the projection 15a shown on the left side in FIG. 7A. Thereupon, the coil spring 17 is compressed between the projection 15b on the right side and the stepped portion 12a as seen from FIG. 7B. Then, the clockwise rotation of the relay ring 9 is restricted at a position at which the restriction wall 13 contacts with an end face of the stopper 16. Thereafter, if such rotating force is canceled, then the relay ring 9 is automatically returned to the centered condition shown in FIG. 7A by the resilient force of the coil spring 17. On the contrary, if the relay ring 9 is rotated in the counterclockwise direction from the centered condition of FIG. 7A, then the coil spring 17 is pressed by the other stepped portion 12b of the recessed groove 12 and is spaced away from the projection 15b on the right side. Thereupon, the coil spring 17 is compressed between the projection 15a on the left side and the stepped portion 12b as seen in FIG. 7C. Then, the counterclockwise rotation of the relay ring 9 is restricted at a position at which the restriction wall 13 contacts with the other end face of the stopper 16. Thereafter, if such rotating force is canceled, then the relay ring 9 is automatically returned to the centered condition shown in FIG. 7A by the resilient force of the coil spring 17.

Referring back to FIG. 4, a printed circuit board 19 is fixed in the inside of the left casing 2, and though not shown, circuit parts of a signal processing circuit and so forth are mounted on the printed circuit board 19. A bracket 20 is fixed to the printed circuit boar 19 in an erected condition, and the rotary volume 21 serving as third manually operable means is fixed to the bracket 20 using a nut 22. Terminals (not shown) of the rotary volume 21 are soldered to a pattern (not shown) of the printed circuit board 19. A rotary shaft 21a extends from a central portion of the rotary volume 21, and a driven wheel 23 is secured to the rotary shaft 21a. The driven wheel 23 is held in meshing engagement with a gear wheel 24 secured to an end of the hollow shaft 14 of the connection ring 10.

Figure 8:
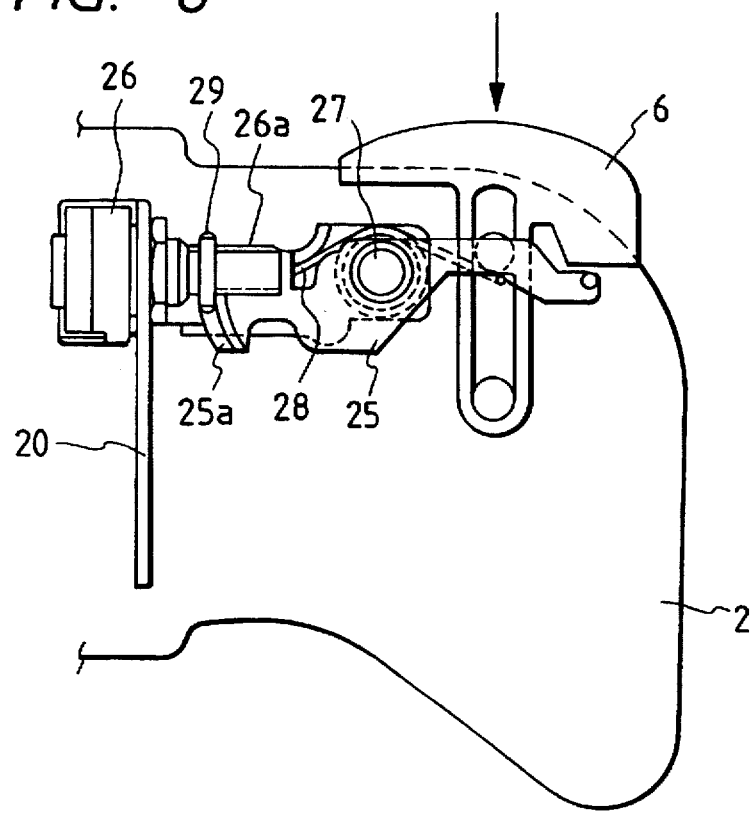
FIG. 8 is a bottom plan view showing a switch mechanism of a left side manually operable key provided on the operation apparatus of FIG. 1.

A rubber contact not shown is disposed between the printed circuit board 19 and each of the start key 4 and the cross-shaped key top 5 from among the manually operable keys disposed on the surface of the left casing 2 so that, if the start key 4 or the cross-shaped key top 5 is depressed, then an on/off signal may be generated with a click feeling. Meanwhile, the remaining left side manually operable key 6 operates another rotary volume 26 disposed in the left casing 2 to generate an analog signal. As seen in FIG. 8, the rotary volume 26 is fixed to the bracket 20 similarly to the rotary volume 21, and the pressing force of the left side manually operable key 6 is transmitted to the rotary volume 26 by way of a pivotal lever 25. The pivotal lever 25 is supported for pivotal motion on a pivot 27 provided in the left casing 2 and is normally biased in the counterclockwise direction in FIG. 8 by a torsion coil spring 28. The pivotal lever 25 contacts at an end thereof with the left side manually operable key 6 and has a toothed portion 25a formed at the other end thereof. The toothed portion 25a of the pivotal lever 25 is held in meshing engagement with a gear wheel 29 secured to a rotary shaft 26a. Accordingly, if the left side manually operable key 6 is depressed, then the pivotal lever 25 is pivoted in the clockwise direction around the pivot 27 to rotate the rotary shaft 26a of the rotary volume 26. On the other hand, if the pressing force to the left side manually operable key 6 is canceled, then the rotary volume 26 is pivoted in the counterclockwise direction by the torsion coil spring 28 to return to its initial condition shown in FIG. 8.

Figure 9:
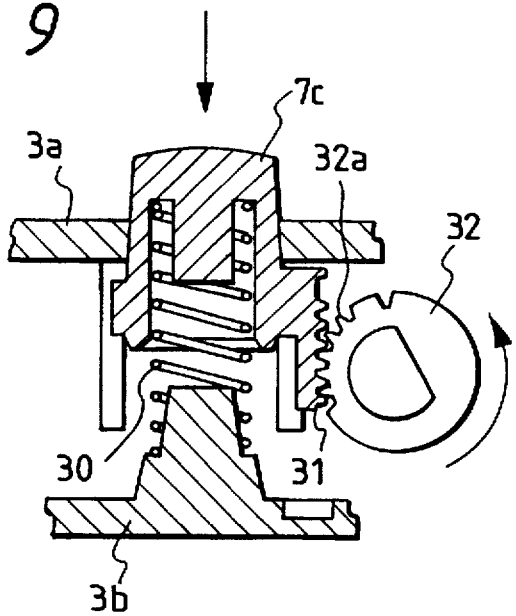
FIG. 9 is an enlarged sectional view showing a switch mechanism of a key switch provided on the operating mechanism of FIG. 1.

Meanwhile, the key switches 7a and 7b and the right side manually operable key 8 from among the operation keys disposed on the face of the right casing 3 adopt switch mechanisms which generate an on/off signal with a click feeling similarly to the start key 4 and the cross-shaped key top 5. Further, each of the remaining key switches 7c and 7d operates a corresponding rotary volume (not shown) disposed in the right casing 3 to generate an analog signal. In particular, referring to FIG. 9, the key switch 7c is held on the lower half 3b of the right casing 3 under an upward resilient force of a coil spring 30. A toothed portion 31 is provided on a side face of the key switch 7c and is held in meshing engagement with a toothed portion 32a of a rotatable plate 32 secured to a rotary shaft of a rotary volume not shown. It is to be noted that an upper end portion of the toothed portion 31 and a corresponding portion of the toothed portion 32a have teeth formed at a greater addendum pitch than the other portions of them so that, upon assembly, the toothed portion 31 and the toothed portion 32a can be positioned readily relative to each other. Accordingly, if the key switch 7c is depressed against the biasing force of the coil spring 30, the rotatable plate 32 is rotated in the counterclockwise direction to rotate the rotary shaft of the rotary volume. Then, if such pressing force is canceled, then the key switch 7c and the rotatable plate 32 are returned to their individual initial conditions by the coil spring 30 as shown in FIG. 9. Though not shown, the key switch 7d is constructed in a similar manner to the key switch 7c.

In this manner, a plurality of printed circuit boards not shown corresponding to the key switches 7a to 7d and 8 including the printed circuit board on which the rotary volumes are mounted are disposed in the inside of the right casing 3, and wiring patterns of the individual printed circuit boards are collected to a right side connector 33 in the insider of the right casing 3. Then, leads 34 connected to the right side connector 33 extend through the inside of the hollow shaft 14 of the connection ring 10 toward the inside of the left casing 2 and are connected to a left side connector 35 mounted on the printed circuit board 19 as seen in FIG. 4. Further, a cable 36 is connected the printed circuit board 19. The cable 36 is led out to the outside of the left casing 2 as seen in FIGS. 1 to 3 so that it is connected to a body of the game machine not shown.

Subsequently, use of the operation apparatus of the embodiment described above to enjoy a game will be described. In this instance, an operator uses the operation apparatus grasping the left casing 2 and the right casing 3 of the housing 1 lightly with the palms of the left and right hands as shown in FIG. 3. Then, the operator will move the position of the left thumb or vary the inclination of the housing 1 to depress any one of four portions specifying up, down, left and right in the cross-shaped key top 5, thereby instructing the moving direction of a character or a cursor on a game screen. In this connection, the operator will move the position of the right thumb to depress one of the four ket switches 7a to 7d or depress the left side manually operable key 6 and/or the right side manually operable key 8 with the left and/or right index finger or fingers (or middle finger or fingers) to selectively instruct various movement conditions. Further, in connection with the direction instruction and/or the movement instruction, the operator will twist the left casing 2 and the right casing 3 with the left and right palms to turn the relay ring 9 secured to the left casing 2 and the connection ring 10 secured to the right casing 3 relative to each other to rotate the rotary shaft 21a of the rotary volume 21 to instruct a different movement condition. Such movement is suitably used as a movement for controlling the operation amount and the operation velocity such as a steering operation or an acceleration operation, for example, in a racing game. In this instance, since an operation which corresponds to a speed when the left casing 2 and the right casing 3 are rotated relative to each other is realized, an improved operation feeling is obtained, which allows the operator to enjoy a game which provides an improved realistic feeling.

In this manner, with the operation apparatus of the embodiment described above, since an analog signal is generated from the rotary volume 21 accommodated in the housing 1 and serving as the third manually operable means when an operator manually turns the left casing 2 and the right casing 3 relative to each other with the left and right palms, the third manually operable means can be manually operated simultaneously when the manually operable keys disposed on the faces of the left casing 2 and the right casing 3 are selectively depressed by the fingers of the left and right hands. This provides an improved operability. Further, since the signal outputted from the third operation means is an analog signal, an operation which corresponds to the speed when the left casing 2 and the right casing 3 are turned relative to each other can be realized. Consequently, a game which provides an improved realistic feeling can be enjoyed with an improved operation feeling.

Further, since the right casing 3 is connected for rotation relative to the relay ring 9 secured to the left casing 2 and the connection ring 10 is secured in the inside of the right casing 3, the force when the left casing 2 and the right casing 3 are manually rotated relative to each other is received by the relay ring 9, but little acts upon the connection ring 10. Consetquently, the power transmission system from the connection ring 10 to the rotary volume 21 can be maintained in a high degree of accuracy for a long period of time.

Furthermore, since the printed circuit board 19 disposed in the left casing 2 and the printed circuit boards disposed in the right casing 3 are connected to each other by way of the leads 34 which extend in the hollow shaft 14 provided at the center of the connection ring 10, although the left casing 2 and the right casing 3 are manually rotated relative to each other, no excessive force acts upon the leads 34. Thus, the operation apparatus can be connected to the body of the game machine using the common cable 36.

It is to be noted that the present invention is not limited to the embodiment described above and the embodiment can be modified in various manners. For example, the third manually operable means may employ, in place of the rotary volume 21, a rotary encoder from which a pulse signal is outputted to provide a third instruction. Further, the numbers of operation keys and/or switch mechanisms disposed on the faces of the left casing 2 and the right casing 3 can be varied suitably. For example, one of the left side manually operable key 6 and the right side manually operable key 8 may be omitted, or a switch mechanism which generates an on/off signal may be employed for all of the operation keys.

What is claimed is:

1. An operation apparatus for a game machine, comprising:

a housing including a pair of leftwardly and rightwardly separate portions of a left casing and a right casing connected for relative rotation to each other;

first manually operable means including a manually operable key disposed on a face of said left casing and manually operable by an operator of said operation apparatus to provide a first instruction;

second manually operable means including a manually operable key disposed on a face of a said right casing and manually operable by the operator to provide a second instruction; and third manually operable means including a rotatable electric part accommodated in said housing and manually operable by the operator to provide a third instruction;

said rotatable electric part generating an electric signal when said left casing and said right casing are manually rotated relative to each other, wherein at least one of said first manually operable means and said second manually operable means includes a rotatable electric part which generates an electric signal when a corresponding one of the manually operable keys is manually depressed, and power of the manually operable key is transmitted to said rotatable electric part by way of a gear mechanism.

2. An operation apparatus for a game machine, comprising:

a housing including right and left divided first casing and second casing and having these first and second casings connected to each other;

a relay ring fixed to said first casing, said relay ring having a groove;

a connection ring fixed to said second casing, said connection ring having a guide bar;

first operable means having an operable key arranged on a surface of said first casing and to which an operator provides a first instruction;

second operable means having an operable key arranged on a surface of said second casing and to which an operator provides a second instruction; and third operable means having a rotary electric component accommodated in said first casing and to which an operator provides a third instruction, wherein said guide bar of said connection ring is slidably received in said groove of said relay ring to rotatably couple said second casing to said first casing, and when said first casing and second casing are rotated relative to each other, an electrical signal is generated from said rotary electrical component which is driven by said connection ring.

3. An operation apparatus for a game machine according to claim 2, wherein said relay ring and said connection ring are oppositely faced to each other, and a coil spring is located on said guide bar and within the groove of said relay ring wherein said coil spring is displaced within the groove by application of a rotational force of the relay ring and connection ring with respect to one another and said coil spring biases the relay and connection ring so that when a rotational force is removed, the relay and connection ring rotate to a rest position.

4. An operation apparatus for a game machine according to claim 2, wherein said rotary electrical component is positioned in a cavity of said relay ring.

5. An operation apparatus for a game machine according to claim 2, wherein a hollow part is located at a center of relative rotation between said first casing and second casing and printed circuit boards accommodated in each of said first casing and second casing are electrically coupled by a cable passing through said hollow part.

6. An operation apparatus for a game machine according to claim 5, wherein said connection ring is formed with a hollow shaft and said rotary electrical component is driven through a gear arranged at an outer circumferential surface of said hollow shaft.

7. An operation apparatus according to claim 2 wherein said groove and guide bar are annular.

* * * * *